United States Patent
Arisaka

(10) Patent No.: US 7,200,072 B2
(45) Date of Patent: Apr. 3, 2007

(54) DOMAIN WALL DISPLACEMENT MAGNETO-OPTICAL RECORDING AND REPRODUCING APPARATUS

(75) Inventor: Katsumi Arisaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 10/615,174

(22) Filed: Jul. 9, 2003

(65) Prior Publication Data

US 2004/0013049 A1    Jan. 22, 2004

(30) Foreign Application Priority Data

Jul. 19, 2002    (JP) .............................. 2002-211260

(51) Int. Cl.
*G11B 11/00* (2006.01)
(52) U.S. Cl. .................. 369/13.05; 369/13.47
(58) Field of Classification Search ............ 369/13.05, 369/13.06, 13.54, 13.52
See application file for complete search history.

(56) References Cited

U.S. PATENT DOCUMENTS

| | | | |
|---|---|---|---|
| 5,055,351 A | 10/1991 | Fujimoto et al. | ........... 428/336 |
| 5,572,502 A * | 11/1996 | Naruse et al. | ............... 369/116 |
| 5,638,229 A | 6/1997 | Shingu et al. | ............ 360/72.3 |
| 5,953,289 A * | 9/1999 | Miyaoka | ................... 369/13.24 |
| 6,027,825 A * | 2/2000 | Shiratori et al. | ............. 428/819 |
| 6,249,489 B1 * | 6/2001 | Fujii et al. | ................ 369/13.54 |
| 6,249,490 B1 * | 6/2001 | Miyaoka | ................... 369/13.14 |
| 6,345,016 B1 * | 2/2002 | Shiratori | ................... 369/13.54 |
| 6,519,211 B1 * | 2/2003 | Murakami et al. | ........ 369/13.08 |
| 6,628,574 B1 * | 9/2003 | Shimazaki et al. | ....... 369/13.09 |
| 6,707,767 B2 * | 3/2004 | Hiroki | ....................... 369/13.38 |
| 6,767,697 B2 * | 7/2004 | Uchida et al. | ............. 369/13.5 |
| 6,980,491 B2 * | 12/2005 | Shiratori et al. | ......... 369/13.42 |
| 6,985,409 B2 * | 1/2006 | Nishikawa | ................ 369/13.54 |
| 2004/0076110 A1 * | 4/2004 | Hino et al. | ............... 369/275.3 |

FOREIGN PATENT DOCUMENTS

JP    6-290496    10/1994

* cited by examiner

*Primary Examiner*—Tan Dinh
(74) *Attorney, Agent, or Firm*—Fitzpatrick, Cella, Harper & Scinto

(57) ABSTRACT

A recording/reproducing apparatus for a domain-wall-displacement magneto-optical recording medium with good format efficiency, capable of providing a good reproduction signal and securing a maximum recording region for a user is provided which comprises a recording circuit that starts recording of an information in a data region at a predetermined timing with a detection signal obtained in the preformat region being used as a reference, and a reproducing circuit that starts reproducing of the information recorded in the data region at a timing earlier than the predetermined timing with the detection signal being used-as a reference.

10 Claims, 15 Drawing Sheets

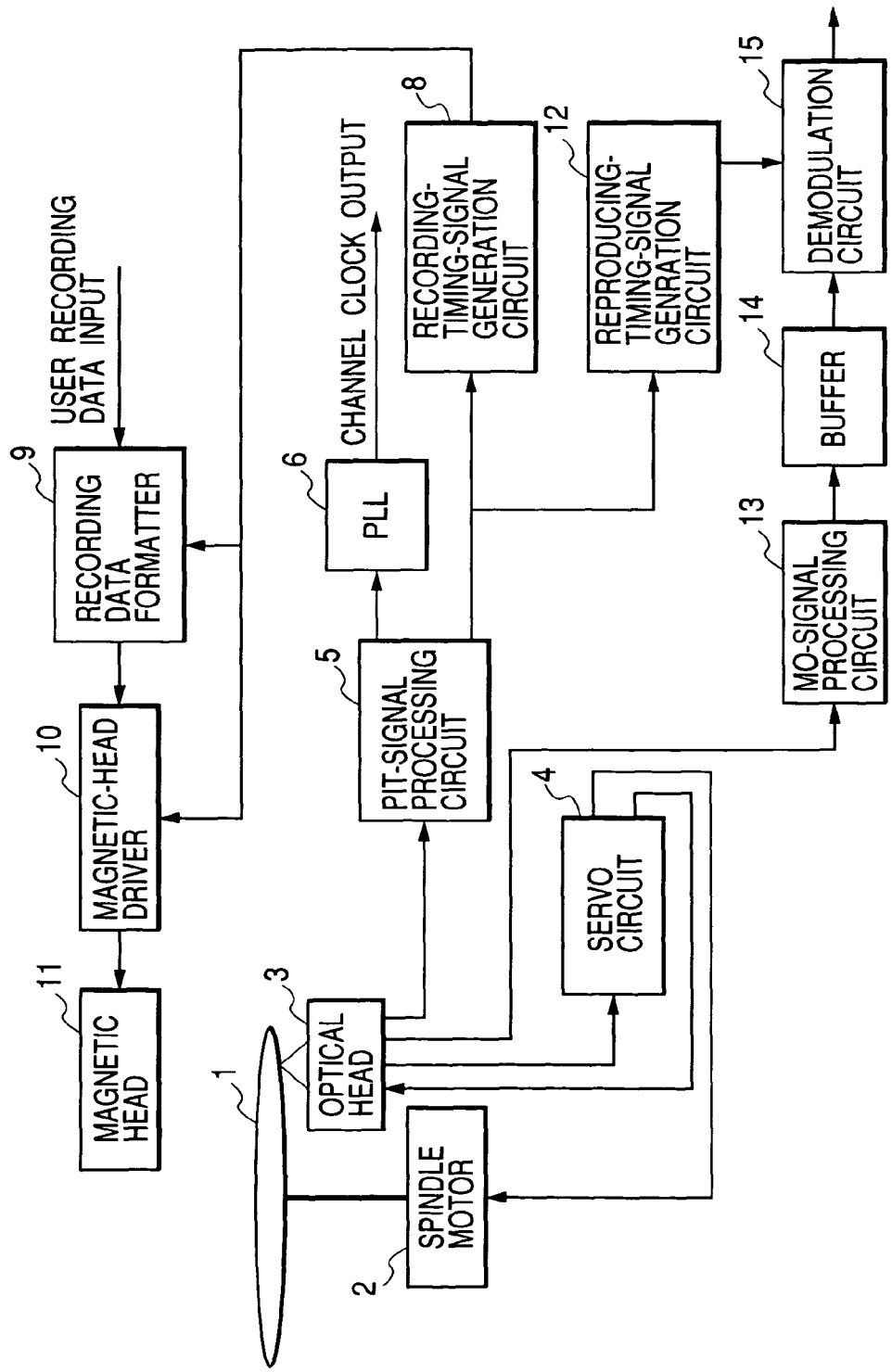

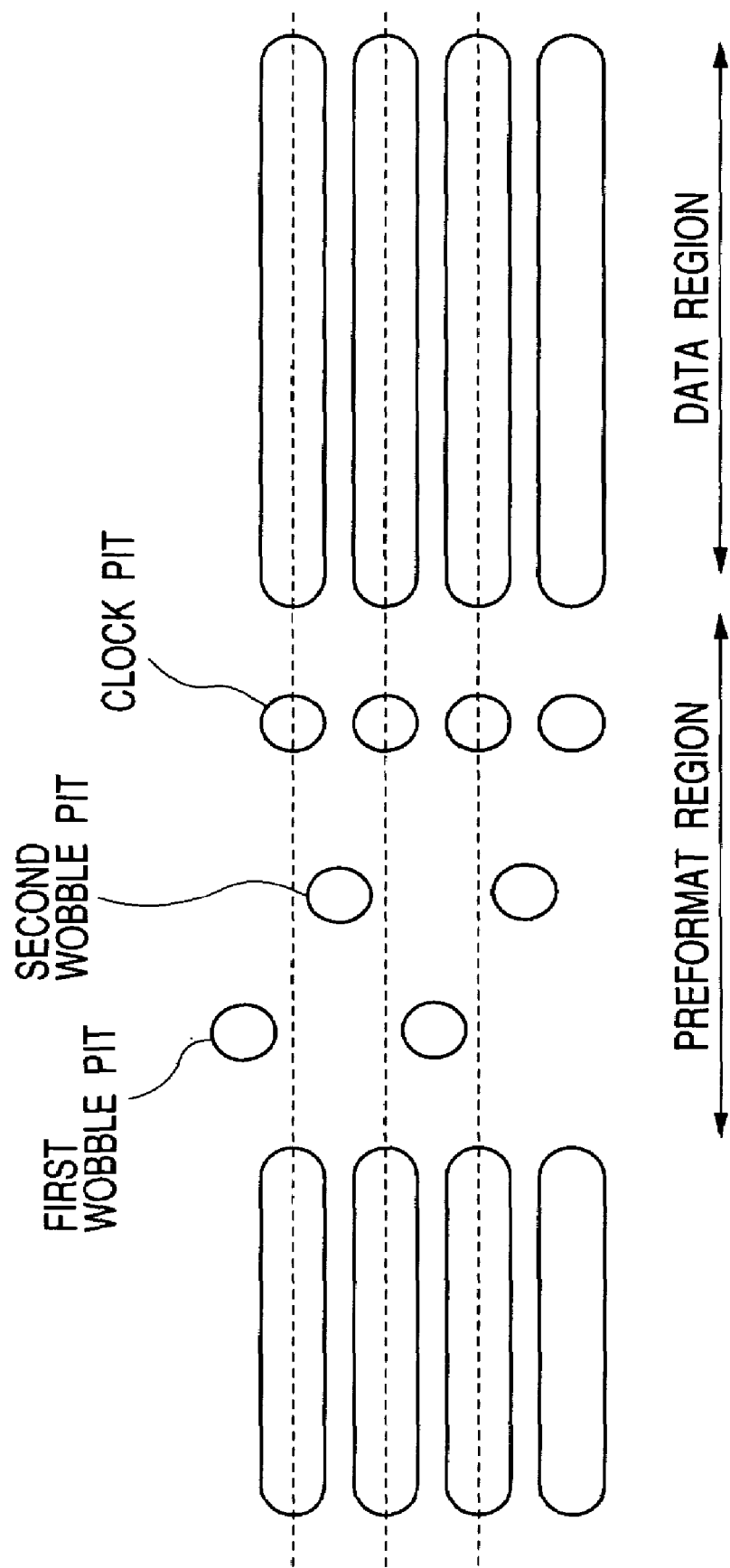

DOMAIN WALL DISPLACEMENT MAGNETO-OPTICAL RECORDING AND REPRODUCING APPARATUS

BACKGROUND OF THE INVENTION

1. Field of the Invention

The present invention relates to a magneto-optical recording/reproducing apparatus for recording or reproducing a digital information in or from an optical recording carrier, and particularly to a recording/reproducing apparatus for enlarging and reproducing a recording magnetic domain through domain wall displacement.

2. Related Background Art

There have been various recording media for respectively storing a digital information in a card or discoid medium. Among such recording media, a magneto-optical disk and its recording/reproducing apparatus are practically used in which a signal is written by raising the temperature of a medium by irradiation with a laser and simultaneously generating a magnetic field at the time of recording, and an information is reproduced in accordance with the polarized direction of the laser beam returned from the medium at the time of reproducing.

Recently, with these recording/reproducing apparatuses, there is a continuing need for improving the recording/reproducing density and new reproducing systems have been proposed in order to meet the need for density improvement. Particularly, the domain wall displacement detection is proposed in Japanese Patent Application Laid-Open No. 6-290496. The domain wall displacement detection is described below by referring to FIGS. 11A to 11C.

FIGS. 11A, 11B and 11C are schematic views for explaining a domain-wall-displacement magneto-optical recording medium and actions in its reproducing method.

FIG. 11A is a schematic sectional view of an example of a domain-wall-displacement magneto-optical recording medium. The magnetic layer of the medium is formed by sequentially stacking a first magnetic layer 11, a second magnetic layer 12 and a third magnetic layer 13. The arrow 14 in each layer denotes the direction of atomic spin. A domain wall 15 is formed at the boundary between regions whose spin directions are opposite to each other. Moreover, a recording signal $S_R$ of this recording layer is also shown as a graph at the lower side. The first magnetic layer 11 is formed by a vertical magnetic film having a relatively small domain-wall coercive force as compared to that of the third magnetic layer 13 at a temperature close to the ambient temperature and a large domain wall mobility, the second magnetic layer 12 is formed by a magnetic layer having a Curie temperature lower than those of the first magnetic layer 11 and the third magnetic layer 13 and the third magnetic layer 13 is formed by a vertical magnetic film.

FIG. 11B is a graph showing a temperature distribution (i.e., relation between position X and temperature T of medium) formed on the above magneto-optical recording medium. Though it is allowed that the temperature distribution is induced on the medium by a light beam applied for reproducing, it is preferable to form a temperature distribution by using another heating means together and raising a temperature from the front side of the spot of a reproducing light beam so that the peak of the temperature is positioned at the rear of the spot. In this case, at a position $X_S$, the medium temperature is kept at a temperature $T_S$ close to the Curie temperature of the second magnetic layer 12. In the figure, $T_R$ represents room temperature.

FIG. 11C is a graph showing the distribution of a domain-wall energy density $\sigma_1$, of the first magnetic layer 11 corresponding to the temperature distribution of FIG. 11B. In the figure, the left-hand ordinate indicates domain-wall energy density σ, the right-hand ordinate indicates forth F acting on domain wall, and the abscissa indicates position X. When a gradient of the domain-wall energy density $\sigma_1$ is present in X-direction as shown in FIG. 11C, a force $F_1$ shown by the following expression acts on the domain wall of each layer present at the position X.

$$F_1 = \partial \sigma_1 / \partial x$$

The force $F_1$ acts so as to displace a domain wall in the direction in which domain wall energy lowers. Because the first magnetic layer 11 has a small domain-wall coercive force and a large domain-wall mobility, a domain wall is easily displaced by the force $F_1$. However, in the region before the position $X_S$ (right side in the drawing), the medium temperature is lower than Ts yet and the region is exchangeably coupled with the third magnetic layer 13. Therefore, the domain wall in the first magnetic layer 11 is also fixed to a position corresponding to the position of the domain wall in the third magnetic layer 13.

As shown in FIG. 11A, when the domain wall 15 is present at the position $X_S$ of the medium, the medium temperature rises up to the temperature Ts close to the Curie temperature of the second magnetic layer and the exchangeable coupling between the first and third magnetic layers is severed. As a result, the domain wall 15 in the first magnetic layer is "instantaneously" displaced to a region having a higher temperature and a smaller domain-wall energy density as shown by a broken line 17.

When the domain wall 15 passes the isothermal line of the temperature $T_s$ formed below the spot 16 of the reproducing light beam, that is, in the vicinity of the front edge of the spot 16 in its traveling direction, all atomic spins of the first magnetic layer in the spot are unified in one direction. Moreover, whenever the domain wall 15 comes to the position $X_S$ in accordance with the movement of the medium, the domain wall 15 is instantaneously displaced below the spot, the direction of the atomic spin in the spot is inverted and all spins are unified in one direction. As a result, as shown in FIG. 11A, the reproduction signal amplitude becomes always constant and maximum independently of the interval between recorded domain walls (that is, recording-mark length) and is completely free from the problem of waveform interference or the like due to an optical diffraction limit. Therefore, it is possible to reproduce signals recorded at a high density independently of an optical diffraction limit.

Moreover, at the time of recording, the medium temperature is raised up to a Curie point with a light beam and a digital signal is recorded on the medium by an externally applied magnetic field during cooling. Specifically, recording is performed by formation of an edge (domain wall) of a recording mark at an isothermal line of the Curie temperature $T_c$ of the third magnetic layer formed in the vicinity of the rear edge of the recording spot in its traveling direction.

However, an apparatus using the above-mentioned recording/reproducing principle has the following problem.

That is, because the edge of a recording mark is formed at the isothermal line of the Curie temperature $T_c$ of the third magnetic layer in the vicinity of the rear edge of the light spot in its traveling direction at the time of recording, recording action is performed at a place shifted to the rear side when viewed from the central position of the light spot.

FIG. 10 shows a relation between a recording signal (a) and the position of formation of a recording-mark (b) at the time of recording. In FIG. 10, in a case where the supply of the recording signal is started when the center of a light beam reaches a position (P), formation of the recording mark is started at a position $X_1$ at the rear of the position (P) in the traveling direction.

In this case, when the recording start timing is the same as the reproducing start timing, because the displacement of a domain wall is started from a front edge of the light spot in its traveling direction at the time of reproducing, the reproducing of the recording mark is started from a position $X_2$ shown by a broken line in (b) of FIG. 10. In this case, the recording mark formed between the positions $X_1$ and $X_2$ is not reproduced and therefore, omission of a reproduction signal is generated. This extremely deteriorates the reproduction signal quality or causes a reproducing unable state.

To solve the above problem, the reproducing start timing has been adjusted to be in agreement with the recording start timing by providing a given invalid period following the recording start timing, that is, shifting a recording-mark forming position in a data region. However, according to this method, the format efficiency is lowered because the invalid period is necessarily present at the head of the data region, so that the characteristic of the domain wall displacement detection, which is an advantageous high-density recording/reproducing system, cannot be completely exhibited.

Moreover, in the case of a format in which a sync pattern for realizing byte synchronization is present in a data region, a detection window signal for detecting a matching signal of the sync pattern is normally formed on the basis of the recording timing at the rearmost end of the sync pattern. However, when the recording timing is offset with respect to the reproducing timing as described above, the matching signal of the sync pattern is not housed within a detection window to cause a detection failure. To solve this problem, it is considered to increase the width of the detection window. However, a problem occurs that an incorrect sync-pattern-matching signal other than an original sync-pattern-matching signal may erroneously be detected.

SUMMARY OF THE INVENTION

It is, therefore, an object of the present invention to provide a recording/reproducing apparatus for a domain-wall displacement magneto-optical recording medium with good format efficiency that secures a maximum recording region for a user while maintaining the reproduction signal quality.

According to the present invention, there is provided a recording/reproducing apparatus for a domain-wall-displacement magneto-optical recording medium for recording or reproducing an information by irradiating a light beam to a data region following a preformat region, comprising a recording circuit that starts recording of an information in the data region at a predetermined timing in accordance with a detection signal obtained in the preformat region and a reproducing circuit that starts reproducing the information recorded in the data region at a timing earlier than the predetermined timing.

BRIEF DESCRIPTION OF THE DRAWINGS

FIG. 1 is an entire block diagram of a magneto-optical-disk recording/reproducing apparatus of the present invention;

FIG. 2 is a view illustrating a configuration of a preformat region in a first embodiment;

DESCRIPTION OF THE PREFERRED EMBODIMENTS (First Embodiment)

First, recording and reproducing operations on a medium in accordance with the present invention are described below. Moreover, a method for determining a shift value between a recording start timing and a reproducing start timing is described below.

Figure 3A:
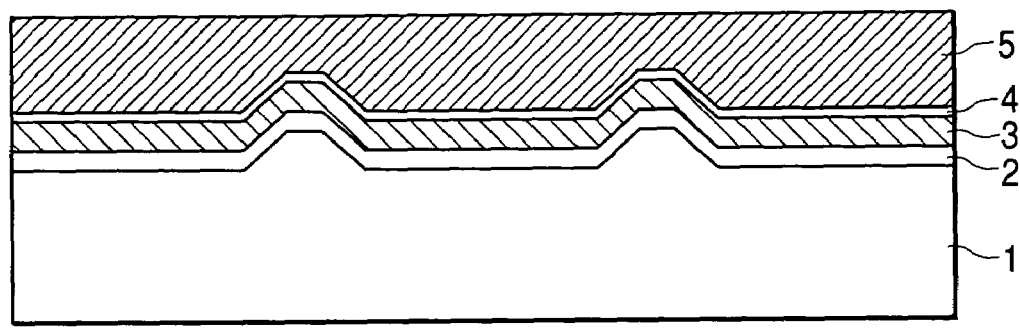
FIGS. 3A and 3B are views illustrating a detailed configuration of a magnetic film in embodiments.

FIG. 3A is a view schematically showing a sectional form of a magneto-optical recording medium in this embodiment. The medium has a layer configuration formed of a substrate 1, an underlying layer 2, a magnetic layer 3, an overlying layer 4, and a UV resin layer 5 provided in the mentioned order from a light incidence side. Land portions are each formed on the substrate so as to be held between groove portions of a large width. The groove pitch is 0.54 µm, the groove width is about 0.40 µm in terms of a half-value width, and the groove depth is about 50 nm. The inclination of the inclined portion is about 45°. Moreover, the land portions are modified (in-plane magnetized state) through anneal treatment and exchangeable coupling between adjacent grooves is severed.

Figure 3B:
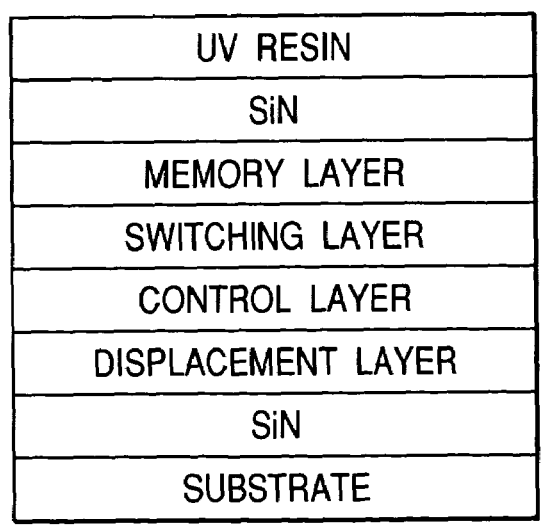

In FIG. 3B, the four layers from the displacement layer (domain wall displacement layer) up to the memory layer (recording-holding layer) constitute the magnetic layer 3 of FIG. 3A. The material/Curie temperature (Tc)/film thickness of each layer are as follows.

Displacement layer (domain wall displacement layer): GdFeCoCr/300° C./35 nm;

Control layer: TbFeCoCr/176° C./15 nm;

Switching layer: TbFeCr/155° C./10 nm; and

Memory layer (Recording-holding layer): TbFeCoCr/320° C./80 nm

Moreover, the thicknesses of the lower SiN as the underlying layer and the upper SiN of the overlying layer are 90 and 30 nm, respectively.

In this case, the Tc values of the respective layers are attained trough compositional ratio control of the components.

In this embodiment, an optical head for effecting recording/reproducing on the above-mentioned medium uses a light source of a wavelength of 650 nm and an object lens with a numerical aperture (NA) of 0.60.

Moreover, the optical and thermal constants of each layer are as follows.

Underlying and overlying layers: n=2.05, k=2.0 [W/mK], c=2.0×10$^3$ [J/m$^3$K];

Magnetic layer: n=2.50+i3.2, k=7.0 [W/mK], c=3.0×10$^3$ [J/m$^3$K];

Substrate and UV resin: n=1.58, k=2.0×10$^{-1}$ [W/mK], c=1.8×10 [J/m$^3$K]

Here, n represents a complex index of refraction and the value of the imaginary number contributes to absorption of light. Moreover, k represents a heat conductivity and c represents a capacitive specific heat.

The following is a result of study on domain wall displacement according to an analysis of light-spot profile and quantity of light absorption of a thin film according to a vector analysis using the above-mentioned media and a temperature distribution analysis based on a thermal diffusion equation using the analysis results.

Figure 4A:
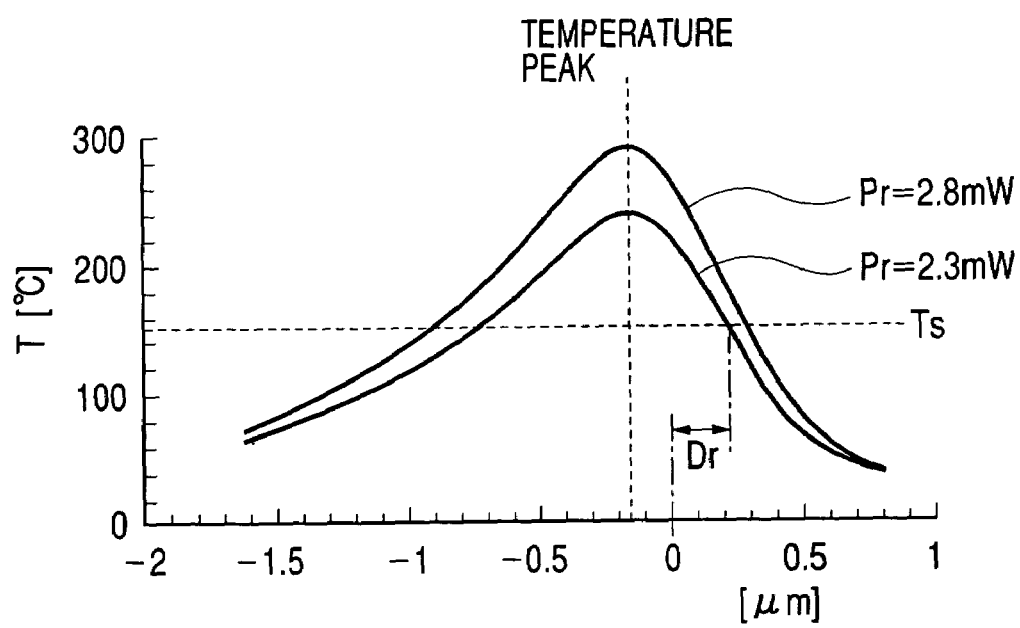
FIGS. 4A and 4B are views illustrating a temperature distribution of a magnetic film during reproducing.
Figure 4B:
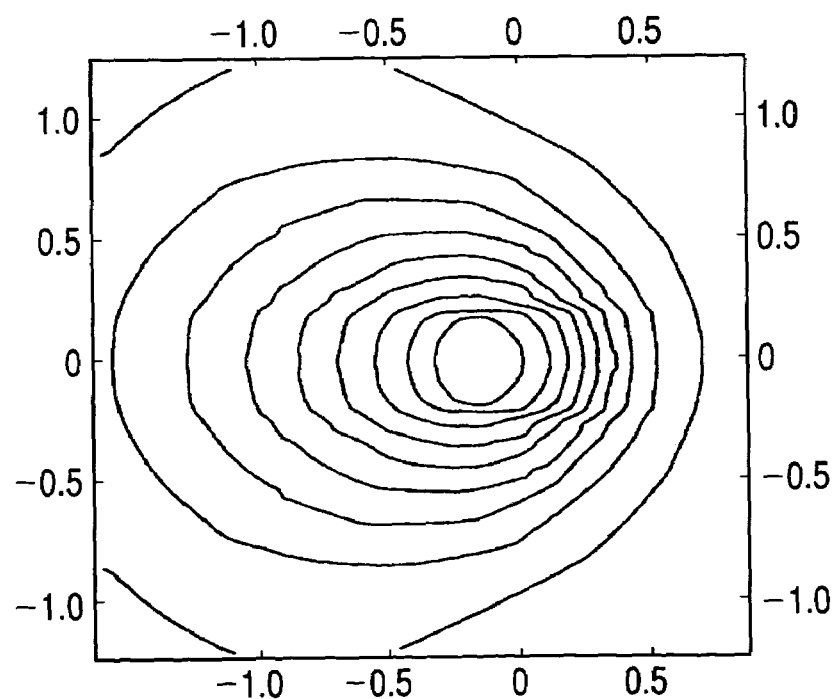

In this embodiment, the linear velocity is 2.0 m/s and FIGS. 4A and 4B show the then temperature distribution on a magnetic layer.

FIG. 4A shows a temperature-distribution sectional view at the track center position of temperature distribution. The axis of abscissa indicates position in the direction of track with a spot position being defined as a reference point and the same applies to FIG. 5 described below. The direction in which a spot relatively travels is expressed by a positive value. The temperature on the medium almost reaches an equilibrium state and a temperature gradient in the magnetic layer in the film thickness direction is almost zero and can be ignored.

In the case of the above magneto-optical recording medium of this embodiment, it is preferable that a temperature peak on the medium at the time of domain-wall displacement reproduction is sufficiently higher than the Curie temperature (shown as $T_S$ in FIG. 4A) of the switching layer and is substantially not more than the Curie temperature of the domain-wall displacement layer.

The optimum reproducing power of the medium in this embodiment is 2.3 to 2.8 mW according to a recording/reproducing experiment. At that time, the temperature distributions shown in FIG. 4A are obtained. As room temperature, 27° C. is adopted as a standard value.

The shapes of isothermal lines do not depend on the reproducing power when normalized at a peak value and are as shown in FIG. 4B.

In FIG. 4A, the domain wall displacement starts at a point where the temperature at a positive position of the axis of abscissa becomes Ts and the domain wall is displaced to the temperature peak. That is, this determines the amount of domain-wall displacement for the medium and reproducing power of this embodiment. Also, at a point where the temperature at a negative position of the axis of abscissa becomes Ts, domain wall displacement can start. However, in the case of the medium of this embodiment, the control layer prevents the start of the domain-wall displacement at the negative position.

In this case, when the reproducing power is set to 2.3 mW, the reproducing start position is distant from the light-beam center (zero point of the axis of abscissa) by a distance Dr to precede by the length shown by the arrow. In FIG. 4A, this length corresponds to about 0.31 μm in terms of the distance on the medium.

Then, a point at which a magnetic domain is formed during operations at the time of recording is mainly described below.

The recording power is about 1.7 to 2.0 times the reproducing power at the time of domain-wall displacement reproduction in the case of the above mentioned magneto-optical recording medium. According to an experiment, good recording can be performed even when the recording power exceeds a value that is two times the reproducing power. However, because the data of an adjacent track is cross-written, a value within the above-mentioned range is preferably used. This value is a value at the time of DC lighting and corresponds to an average value thereof at the time of pulse lighting.

Figure 5:
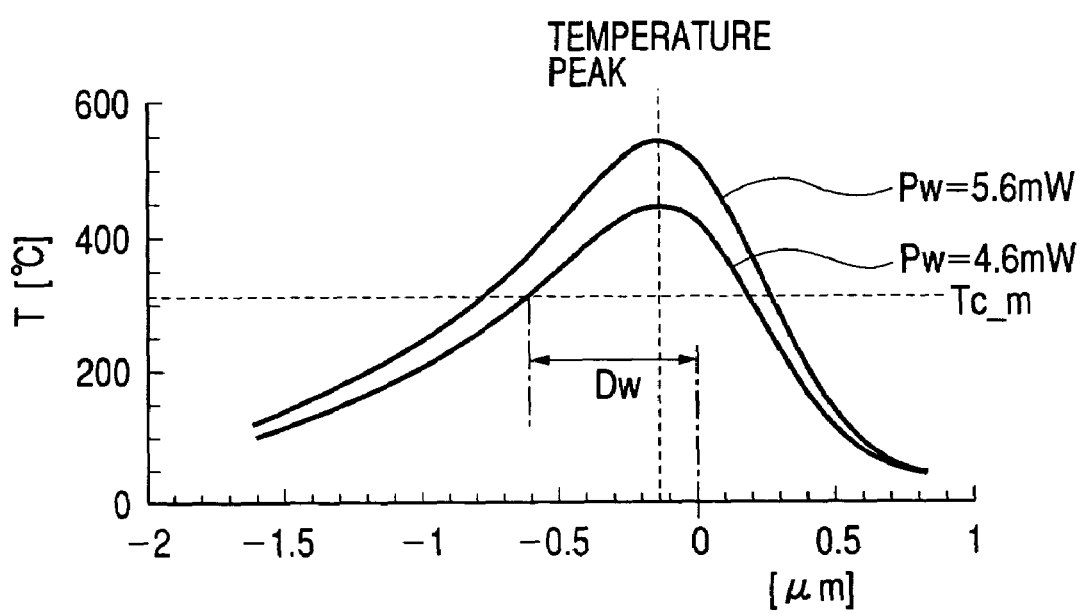
FIG. 5 is a view illustrating a temperature distribution of a magnetic film during recording.

FIG. 5 shows a temperature-distribution sectional view at the track center position of temperature distribution at the time of recording. In the figure, temperature distributions at the time of recording powers of 4.6 mW and 5.6 mW that are two times the 2.3 mW and 2.8 mW of the reproducing power adopted above.

Because the recording is determined at the point of the Curie temperature (Tc_m) of the memory layer, an edge (domain wall) of a recording mark is formed at the point of the Curie temperature of the memory layer at the rear in the traveling direction of the spot.

In this case, when setting the recording power to 4.6 mW, the position of recording is distant from the light spot center (zero point of the axis of abscissa) by the distance Dw, which is a position that follows by the length shown by the arrow in FIG. 5. In FIG. 5, this length corresponds to about 0.8 μm in terms of the distance on the medium.

Therefore, the time difference between the recording start timing and the reproducing start timing can be determined based on the time corresponding to the sum of the above-mentioned distances Dr and Dw. In this embodiment, because the linear velocity is 2.0 m/s, the times corresponding to Dr and Dw are T(Dr)=155 nsec and T(Dw)=400 nsec, respectively and the sum thereof is about 555 nsec. Further, because these times correspond to about 7 clocks and about 18 clocks in terms of the number of clocks when assuming the channel clock at the time of recording/reproducing as 45 MHz, the number of clocks of the sum of 7 and 18 clocks becomes about 25 clocks. This serves as the timing difference between recording and reproducing.

Then, a method of setting the recording start timing and the reproducing start timing is described in detail below.

First, the PIT pattern on a disk in this embodiment is described below by referring to FIG. 2. A spiral track is constituted by a series of segments in which preformat regions and data regions are alternately arranged as shown in FIG. 2. In each preformat region, two wobble bits that are offset by a half-track to detect a tracking error and a clock pit for generating a clock are formed.

A entire block diagram of an example when using this disk is shown in FIG. 1.

In FIG. 1, a spindle motor 2 rotates a disk 1. A laser beam is emitted from an optical head 3 and two sensors in the head detect a reflected light whose polarization direction is determined by a magnetization pattern. The sum of the sensor outputs is supplied to a pit-signal processing circuit 5 as a pit signal showing presence or absence of a pit. The difference between the sensor outputs is supplied to a MO-signal processing circuit 13 as an MO signal showing a magnetic pattern recorded by a magnetic head.

Moreover, the optical head 3 detects a reflected light quantity independently of the above mentioned and a servo circuit 4 controls the position of a lens actuator in the optical head 3 in accordance with the information to the reflected light quantity. At the time of recording, a recording-timing-signal generation circuit 8 generates a write gate based on a detection signal supplied from the pit-signal processing circuit 5. The write-gate signal is a signal for controlling recording operation in a recording data formatter 9 and a magnetic-head driver 10. At the time of reproducing, a read gate is generated by a reproducing-timing-signal generation circuit 12 on the basis of a detection signal supplied by the pit-signal processing circuit 5. A reproduction signal is properly filtered and binarized by an MO-signal processing circuit 13 and then temporality stored in a buffer 14 and demodulated into UserData by a demodulation circuit 15. In this case, the read gate controls the demodulation circuit 15 and the start of operations of the preceding buffer 14 at the time of reproducing.

At the time of recording, the pit-signal processing circuit 5 detects a clock pit of a preformat region and outputs a pit signal to a PLL circuit 6. The PLL circuit 6 reproduces, based on a detected pit signal, a clock synchronizing with the pit signal. Though the destination of the clock signal is not illustrated for simplification, the reproduced channel clock is supplied to each block so as to serve as an operational reference-clock at the time of recording. Particularly, the clock is also supplied to the recording-timing-signal generation circuit 8 and the recording-timing-signal generation circuit generates a write gate.

Figure 7:
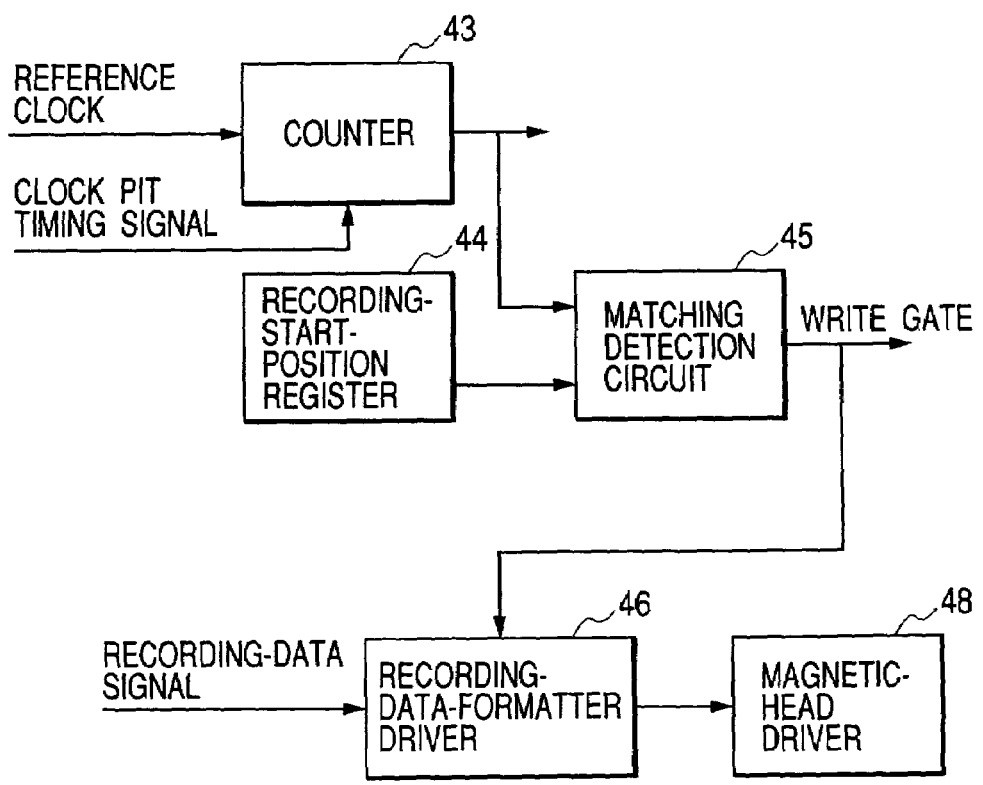
FIG. 7 is a block diagram showing the timing operation at the time of recording in the first embodiment.

FIG. 7 shows details of a recording-timing generation circuit. In FIG. 7, reference numeral 43 denotes a counter for counting clocks, 44 denotes a recording-start-position register to which a value is designated by a not-illustrated CPU, 45 denotes a matching detection circuit, 46 denotes a recording-data formatter including a modulation circuit and 48 denotes a magnetic head.

Figure 6:
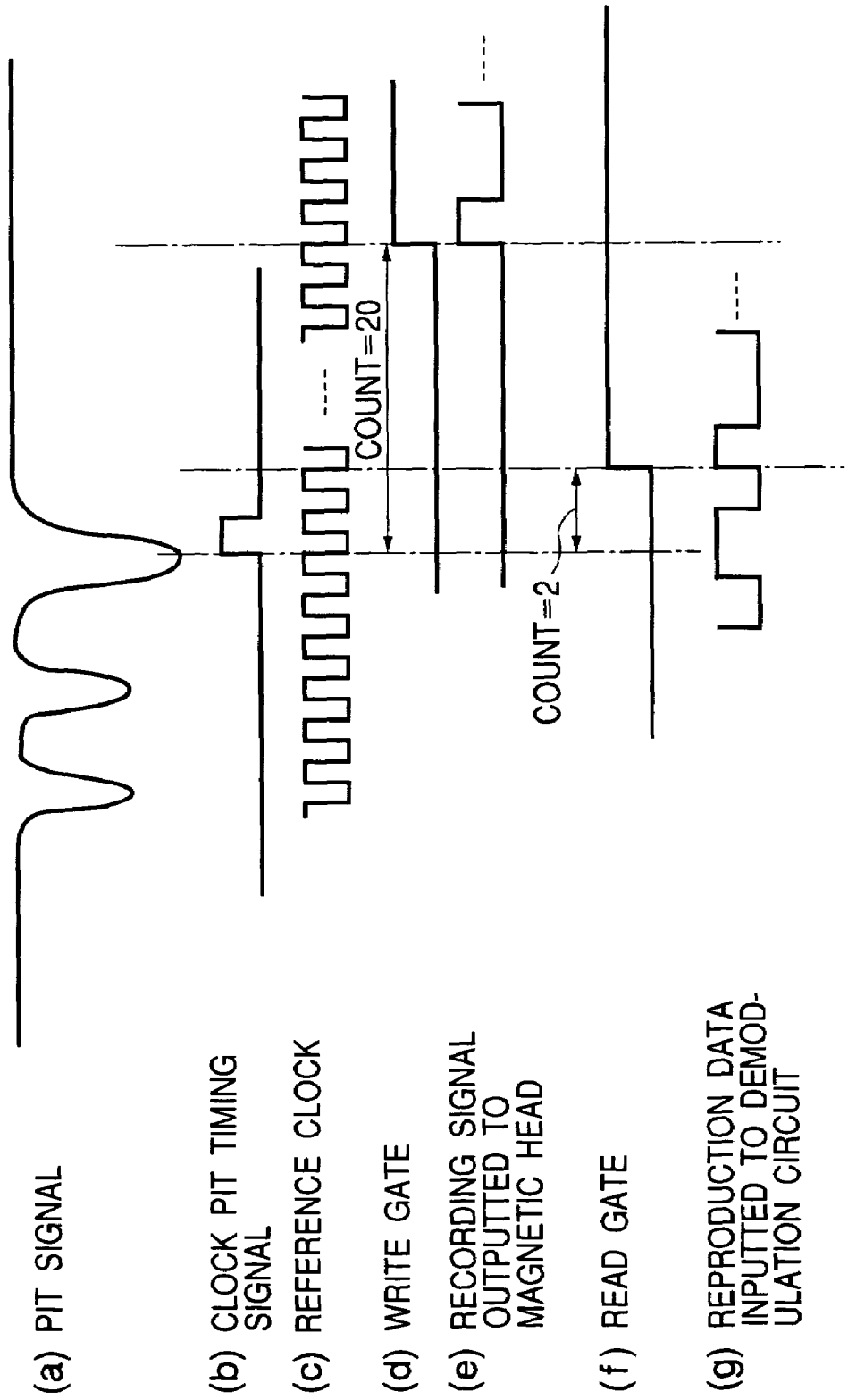
FIG. 6 is a view showing a relation between prepit reproduction signal, clock, and gate signal as recording/reproducing start timing in the first embodiment.

As shown in FIG. 6, the pit-signal processing circuit 5 of FIG. 1 outputs a pulse (b) that rises at the signal timing of a clock pit from a pit signal (a). Moreover, the PLL circuit 6 detects a phase difference between the pulse and an internal clock, controls the oscillation frequency of a not-illustrated internal voltage control oscillator (VCO) and operates such that the phase difference becomes zero. A clock (c) thus reproduced is counted by the counter 43 built in the recording-timing-signal generation circuit 8. The counter 43 is a means for restarting in accordance with a clock-pit timing signal and counting the reference clocks.

Moreover, a not-illustrated controller sets the number of counts of recording start positions to the recording-start-position register 44. The matching circuit 45 compares a count result by the counter with the value of the above-described register. When the former matches with the latter, the circuit 45 becomes HIGH and outputs a write gate (d) serving as a recording timing signal for maintaining the HIGH state by a predetermined number of counts after becoming HIGH.

When the write gate signal is input to the formatter, the formatter outputs the modulated recording data previously stored to the magnetic head to generate a magnetic field corresponding to a recording data pattern on the medium. In conjunction with this operation, a laser emits light at a power suitable for recording, so that a recording data pattern is recorded on the medium.

Here, a value to be written in the register by the controller not illustrated is the number of clock counts obtained by adding the offset for the number of clocks corresponding to Dw which is a shift at the time of recording, to the number of clock counts corresponding to a recording-region start position counted from the clock pit. For example, when assuming a linear velocity as 2.0 m/s, a reference clock frequency as 45 MHz and a distance from the clock pit to the recording-region start position on the medium as 2.4 µm, the number of clock counts corresponding to the recording-region start position counted from the clock pit is 54 counts. Moreover, because the shift Dw at the time of recording is about 18 counts as described above, the sum 72 is set to the recording-start-position register inputted.

Figure 8:
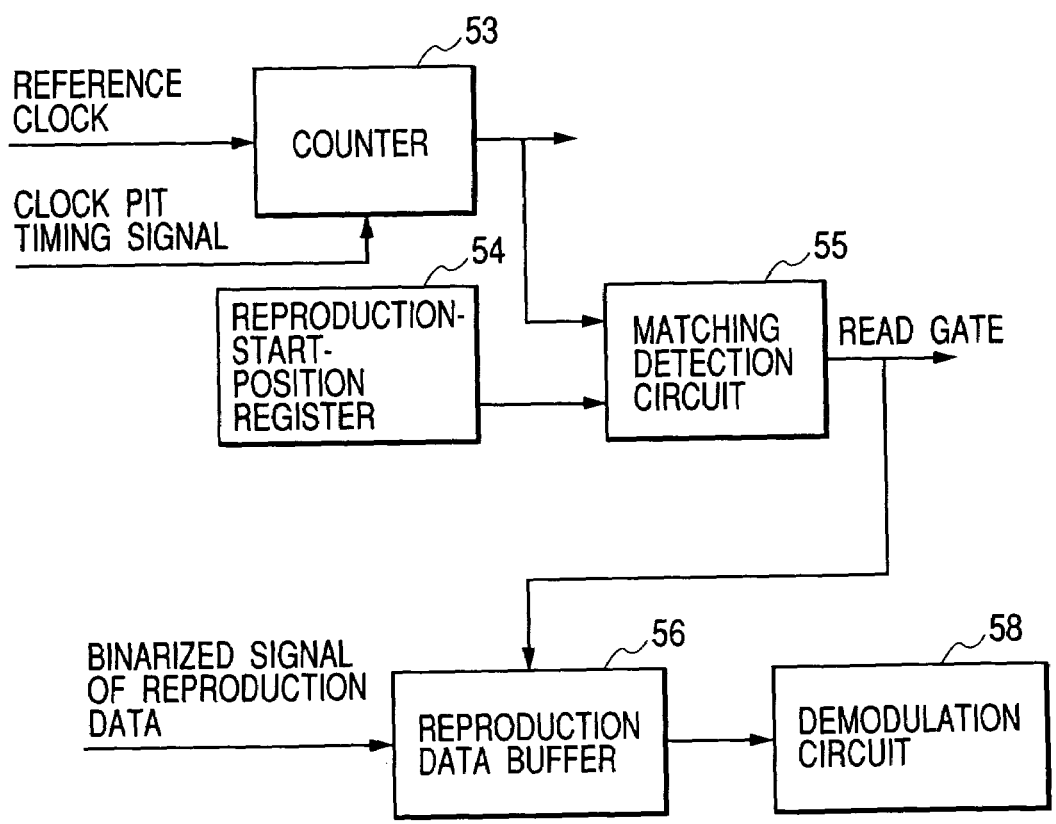
FIG. 8 is a block diagram showing the timing operation at the time of reproducing in the first embodiment.

Then, the timing at the time of reproducing is described below. At the time of reproducing, a reproducing-timing-signal generation circuit 12 generates a read gate. FIG. 8 shows details of the reproducing-timing generation circuit. In FIG. 8, reference numeral 53 denotes a counter for counting clocks, 54 denotes a reproduction-start-position register to which a value is designated by a not-illustrated CPU, 55 denotes a matching detection circuit and 58 denotes a demodulation circuit.

Also, at the time of reproducing, a PLL circuit reproduces a reference clock (c) at a predetermined frequency synchronizing with a clock-pit timing signal (b) detecting a clock pit signal. In FIG. 8, the counter 53 is means for restarting in accordance with a binarized signal and counting reference clocks. Moreover, a not-illustrated controller sets the counted value of reproducing start position to the reproducing-start-position register 54. The matching circuit 55 compares the count result of the counter with the value of the reproducing-start-position register. When the former matches with the latter, the circuit becomes HIGH and outputs a read gate (f) serving as a reproducing timing signal for maintaining the HIGH state by a predetermined number of counts after becoming HIGH.

When the read gate becomes HIGH, the demodulation circuit starts demodulation for reproducing data input from the point of time when the circuit becomes HIGH. The demodulation circuit of this embodiment uses an RLL (1,7) code normally used for an optical disk. Because the code converts two bits to three bits at the time of modulation, three bits are converted into two bits by a single demodulation operation at the time of demodulation. Though not illustrated, after the read gate rises, the reproduction data is divided at every three bits and demodulation is performed for each divided data.

Here, the value written in the reproducing-start-position register by the above-mentioned controller not-illustrated is a value obtained by subtracting the above recording/reproducing timing difference from the counted value at the time of recording.

For example, when assuming the linear velocity as 2.0 m/s, the reference clock frequency as 45 MHz and the distance from the clock pit to the recording-region-start position on the medium as 2.4 µm similarly to the above mentioned, the value set to the recording-start-position register was 72. Moreover, because the timing difference between recording and reproducing is 25 clocks, the value to be set to the reproducing-start-position register becomes 47 as a difference therebetween.

The timing difference resulting from the shift Dw or Dr at the time of recording/reproducing may not become an accurate multiple of channel clocks. In this case, the phase of reproduced data and the reference clock are shifted in phase from each other by $\Delta T$ ($\Delta T<T$) with respect to T that corresponds to one cycle of a channel clock. This impairs a window margin that is the allowance of a data change point to a clock and causes an error rate to deteriorate. However, this problem can be resolved by providing a correction equivalent to the above delay for either of a clock at the time of reproducing and reproduced data.

Figure 9:
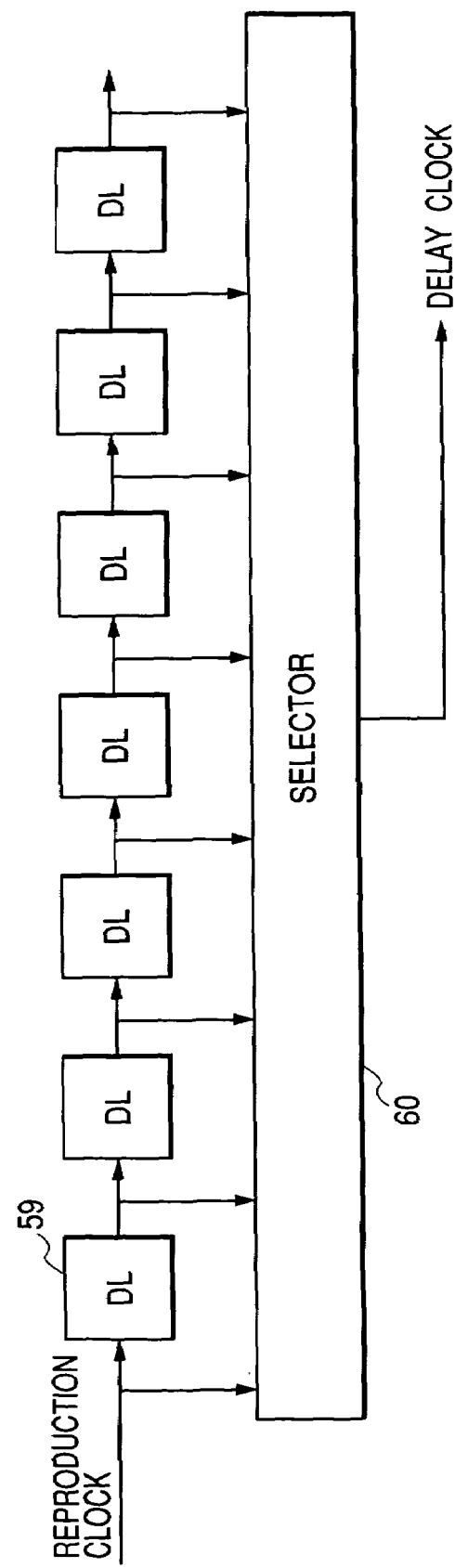
FIG. 9 is a block diagram showing a delay circuit in the first embodiment.
Figure 10:
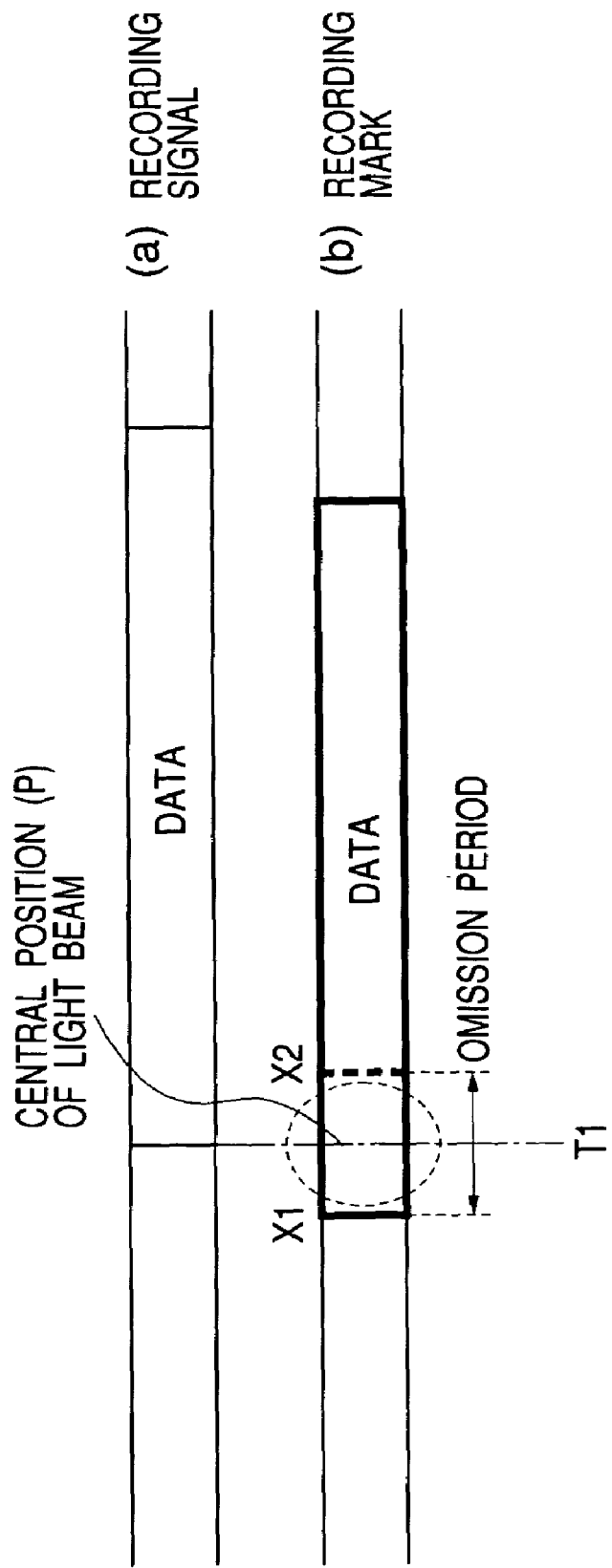
FIG. 10 is a view showing a relation between a light beam and a signal at the time of recording and reproducing in the prior art.
Figure 11A:
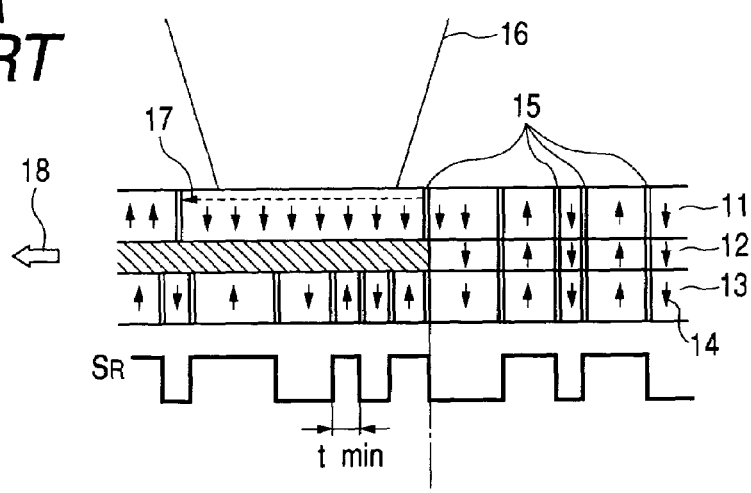
FIGS. 11A, 11B and 11C are views illustrating the operation principle of the domain wall displacement detection.
Figure 11B:
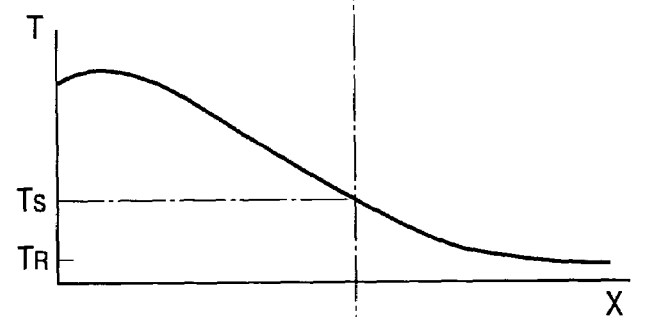
Figure 11C:
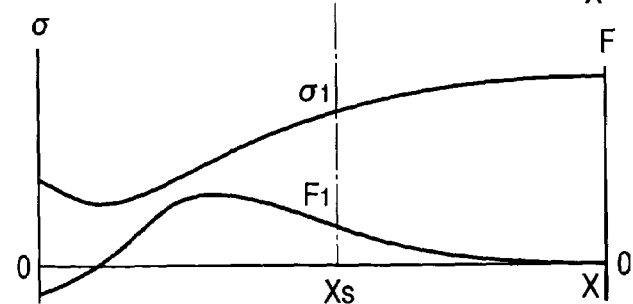

FIG. 9 shows a block diagram of a delay circuit. In FIG. 9, a reproduction clock is delayed by seven DL lines 59 having a delay value of T/8, a clock having an optimum delay value is selected out of DL outputs and original clocks by a selector 60 and supplied to the circuit of a rear-stage reproducing circuit as a delay clock and adjusted so as to obtain the maximum window margin.

Thus, by setting the reproducing start timing to a timing earlier than the recording start timing on the basis of a predetermined prepit in a preformat region, the first part of the recorded data can be completely reproduced, thereby improving the format efficiency.

(Second Embodiment)

Figure 12:
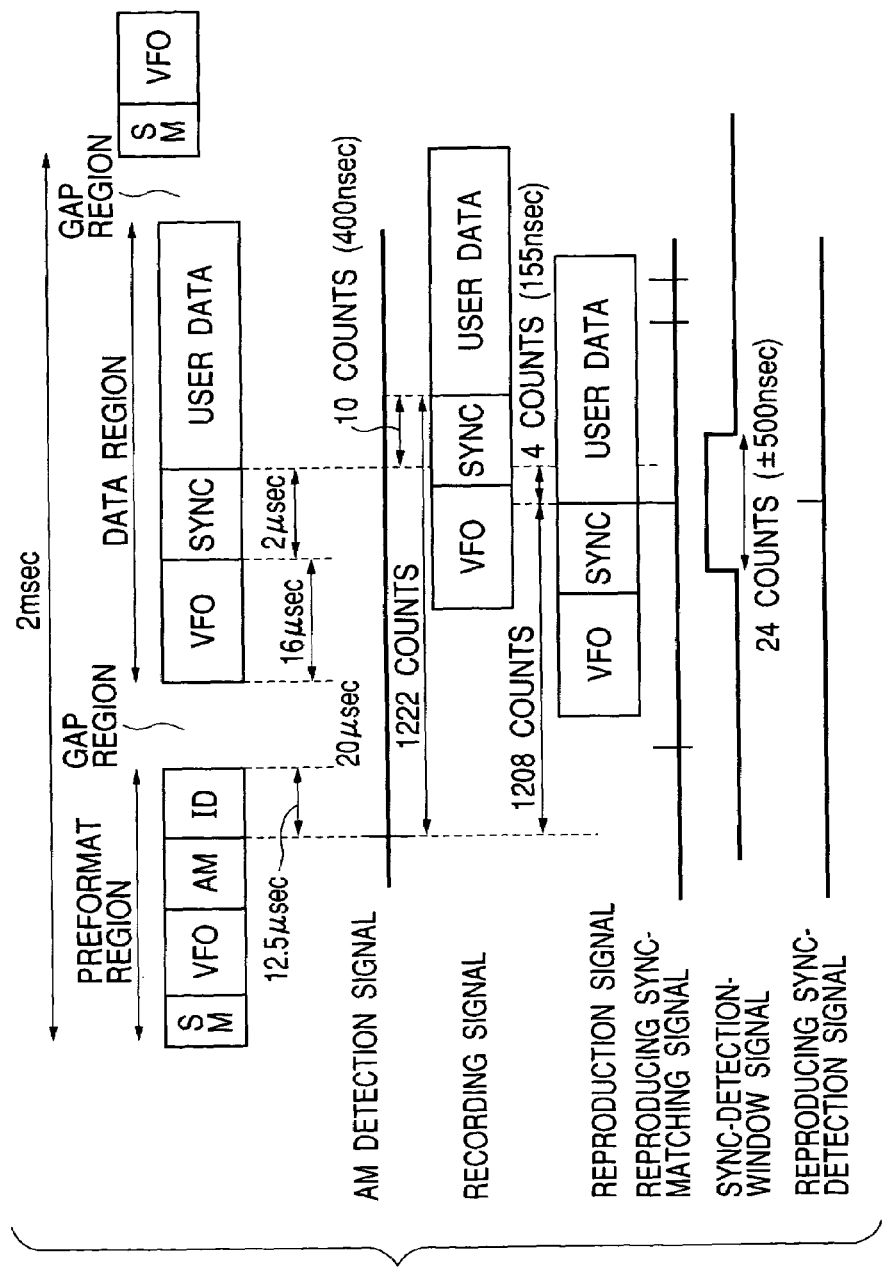
FIG. 12 is a view showing a signal format and a timing chart in a second embodiment.

In this embodiment, application to the format type for recording a sync signal for byte synchronization in a data region. FIG. 12 shows a pit pattern of a disk of this embodiment. A spiral track has a constitution in which sectors each constituted by a preformat region and a data region are continuously arranged as shown in FIG. 12. Each preformat region is constituted by a fixed pattern (VFO part) for extracting a clock when detecting an address, an address mark (AM) and an ID part having an address recorded, following a sector mark (SM) indicating the head of a sector.

In a data region, a SYNC mark for attaining byte synchronization and a UserData are recorded following a VFO part serving as a fixed pattern for leading a PLL for data. Incidentally, in this embodiment, it is assumed that the UserData is modulated by an RLL (1,7) as a Run Length Limited Code and recorded. Moreover, between the data region and the preformat region, a GAP region that is a no-recording part is formed in consideration of the rotational fluctuation of the disk. In this embodiment, a-period of 20 μsec is set for the GAP region, assuming a sector cycle as 2 msec and the range of rotational fluctuation as 1% or less. Moreover, the period of the ID part is set to 12.5 μsec, the VFO part of the data region is set to 16 μsec, and the SYNC part is set to 2 μsec.

Then, address detection at the time of recording/reproducing is described below. In address detection, a sector mark signal allowing asynchronous detection is detected and then an ID clock is formed by a PLL circuit in accordance with a reproduction signal supplied from the VFO part. Subsequent address mark is established by means of the thus formed clock to fix byte sync, and then a subsequent address pattern is detected to detect the address value of the sector concerned. The address value thus detected serves as the address information on this sector.

When recording a data, recording is performed in the order of VFO, SYNC and USERDATA shown in FIG. 12 at a predetermined timing on the basis of the address mark of the preformat region. Further, in this case, as a clock for generating a recording signal, a clock outputted by a quartz oscillator (not shown) is employed.

When reproducing data, an address value is detected, then a data clock is formed by a PLL circuit for DATA at the VFO part of the data region, the subsequent SYNC signal is detected to establish byte synchronization, and then demodulation is performed in accordance with the RLL (1,7) from the data immediately after the establishment of the byte synchronization to reproduce the original UserData. Incidentally, the PLL is locked to an output clock of the above-mentioned quartz oscillator until the arrival of the VFO part, and when the VFO part arrives, the PLL operates so as to coincide in phase with the reproduction signal of the VFO part. Therefore, clocks for data outputted by the PLL keep almost the same frequency.

The format of this embodiment is generally used for a continuous servo system. In the case of this format, however, the time of one sector is longer than that of the format of the first embodiment. Therefore, there is a problem that the format of this embodiment is liable to be influenced by the rotational fluctuation of a disk, so that a start position of a reproduction signal may easily be fluctuated. Therefore, a SYNC signal for determining the start timing of the data in the reproduction signal is recorded in the data region. Thus, a pattern matching with the SYNC pattern is detected out of the reproduction signal to determine the head of data.

Though the SYNC signal has a code string such as 0100001001000010001000100100010000100100 . . . as a pattern capable of properly determining a timing even if there are errors of several bits or a shift by one bit in the pattern, the same pattern may appear also in the UserData. Therefore, a detection window signal is generated to detect pattern matching within the range of the window signal. Incidentally, this pattern detection is generally performed such that when a pattern almost matching with the above mentioned pattern arrives, a matching signal is outputted at the rear end of the pattern.

Then, the detection-window-signal generation timing in this embodiment is described below in more detail.

In the case of this embodiment, the recording start position at the head of a data region on a medium is a position corresponding to 32.5 μsec (ID part (12.5 μsec+GAP region (20 μsec)) apart from the rear end of an address mark (AM). When assuming a linear velocity as 2 m/s and a channel clock as 24 MHz, the time from the rear end of the address mark is equivalent to 780 counts. Moreover, the offset value for the number of clocks corresponding to the shift Dw at the time of recording is added to the 780 counts as with the first embodiment. The time corresponding to the shift Dw=0.80 μm at the time of recording becomes 400 nsec in the case of this embodiment, which is equal to 10 in terms of the number of clocks. Therefore, 790 is set to the recording-start-position register at the time of recording and the recording start timing is measured as with the first embodiment. Incidentally, because the recording timing at the rear end position of the SYNC signal of the recording signal is 18 μsec after the start of recording at the head of VFO in the data region (after 432 counts in terms of channel clock), the timing corresponds to 1,222 counts from the rear end of the address mark.

A detection window signal for detecting a SYNC signal at the time of reproducing is described below in detail.

The recording start timing is positionally offset with respect to the reproducing start timing by 1.11 μm obtained by addition of Dr=0.31 μm to Dw=0.80 μm as is the case with the first embodiment. Because the linear velocity at the time of reproducing is the same as the first embodiment, the times become T(Dr)=155 nsec and T(Dw)=400 μsec, respectively, so that the time difference between the recording start timing and the reproducing start timing is about 555 nsec as the total. Because the channel clock is 24 MHz in the case of this embodiment, the above times become approximately 4 counts and 10 counts, so that the difference between the recording start timing and the reproducing start timing becomes about 14 counts as the total. Therefore, the generation timing of the SYNC detection signal outputted at the rear end of the SYNC pattern at the time of reproducing becomes 1,208 counts obtained by subtracting 14 counts from 1,222 counts as the above-mentioned timing at the time of recording.

Moreover, the detection width of the detection window signal is described below. As described above, the timing of the SYNC detection signal is approximately 1,208 counts after the rear end of the address mark. However, when the maximum rotational fluctuation is 1%, the linear velocity will also be fluctuated by about 1% or less. Therefore, there is a possibility that reproduction may be effected with an offset within a range of 12 counts forwardly or backwardly. Therefore, it is preferable to generate a detection window signal having a width of 1,208 counts ± about 12 counts from the address-mark detection signal. Thereby, it is possible to securely extract a SYNC detection signal while allowing the SYNC-detection timing fluctuation due to the rotational fluctuation. That is, it is allowed to set a detection window signal on the basis of an address-mark detection signal so as to become HIGH state from 1,196 counts to 1,220 counts.

Figure 13:
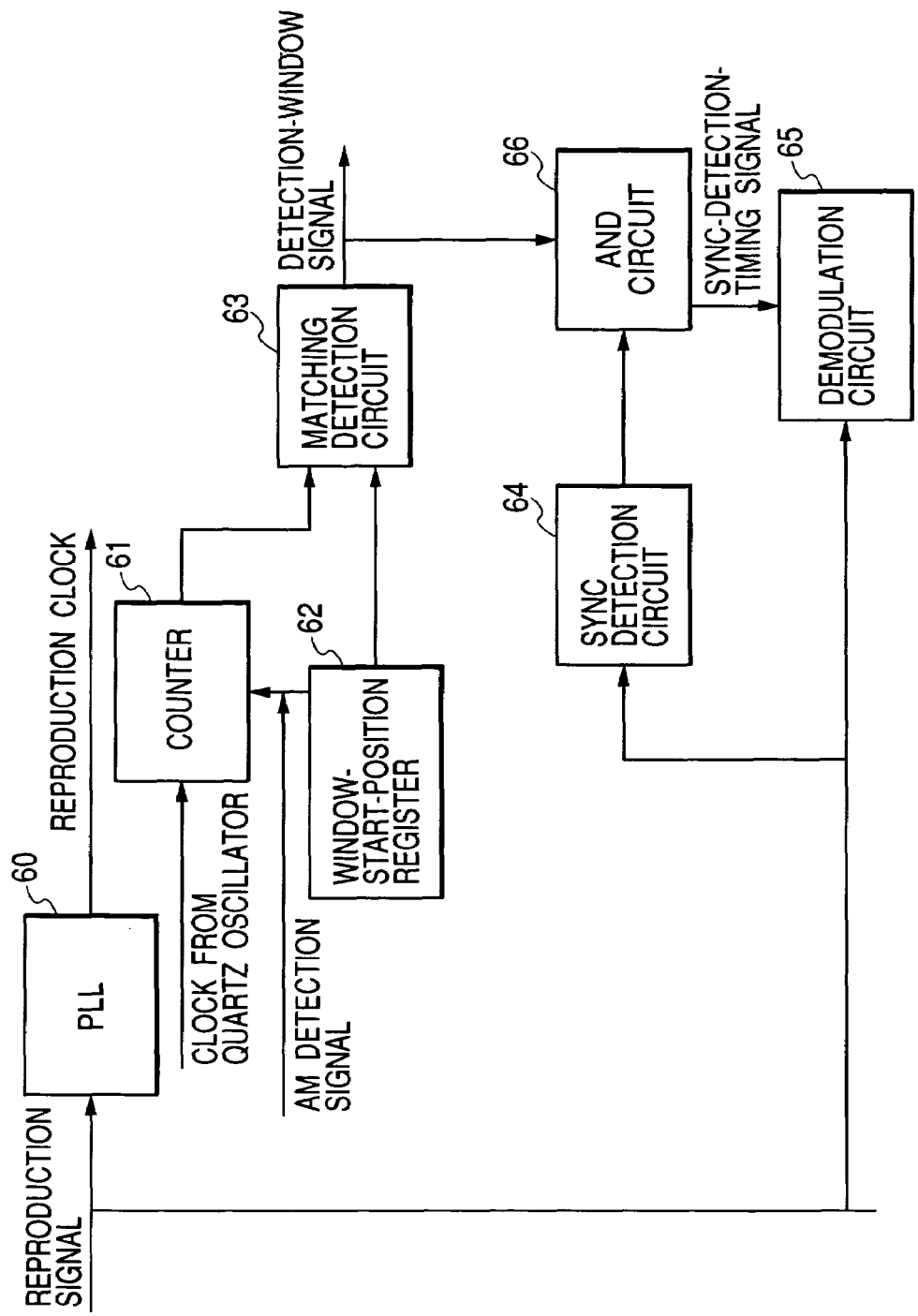
FIG. 13 is a block diagram in the second embodiment.

Then, a specific circuit for recording/reproducing an information in accordance with the above-mentioned format is described below by referring to FIG. 13. FIG. 13 is a block diagram of a reproducing circuit including a SYNC signal, detection circuit. First, to a PLL circuit 60 is inputted a reproduction signal that has been reproduced from a data region, properly equalized, and then binarized. The PLL circuit 60 detects a phase difference between the reproduction signal and a reproduction clock to be outputted and generates a clock for data by controlling a built-in voltage control oscillator (VCO) so that the phase difference becomes zero. A counter 61 is cleared at the timing of an address-mark detection signal detected by a not-illustrated pit-signal processing circuit and counts output clocks of a not-illustrated quartz oscillator. A not-illustrated controller sets 1,196 that is the number of clocks corresponding to a window start position to a window-start-position register 62. A matching detection circuit 63 compares the counted output value from the counter 61 with the value set to the register 62, and when the former value matches with the latter value, outputs a detection window signal which becomes HIGH state for a period equivalent to a predetermined number of clocks (24 in the case of this embodiment).

A SYNC detection circuit 64 outputs a SYNC matching signal which becomes HIGH for a period equivalent to one clock when matching with a SYNC pattern or at the timing to be matched at a predetermined number of errors or less from the binarized pattern of the reproduction signal. Moreover, an AND circuit 66 computes the logical product between the SYNC matching signal and detection window signal and outputs the result thereof as a SYNC detection signal.

When this SYNC detection-timing signal is inputted to a demodulation circuit 65, the demodulation circuit starts demodulation of the data modulated by an RLL (1,7) code. Because the RLL (1,7) converts two bits into three bits at the time of modulation, it converts three bits collectively into two bits at the time of demodulation. Thus, the demodulation starts while dividing data into every three bits from the bits of the reproduction signal immediately subsequent to the SYNC.

Though the recording and reproducing timings are described in accordance with the number of counts obtained on the basis of an address-mark detection signal, the timings are not restricted to the address-mark detection signal. It is also allowed to count numbers on the basis of a detection signal of the final bit of an address part. Moreover, it is allowed to count numbers on the basis of a wobbling detection signal supplied from a wobbled groove.

As described above, in the case of this embodiment, the generation timing of a detection window signal for detecting a SYNC signal is measured on the basis of a predetermined prepit in a preformat region. Particularly, by setting the central timing of a detection window to a timing earlier than the recording timing of the rearmost end of a SYNC signal, the manifestation timing of a SYNC signal is made to match with the generation timing of a detection window signal so that a SYNC detection signal can be more accurately detected. Therefore, it is not necessary to set a detection window signal to an excessively wide detection range and it is possible to prevent a phenomenon of erroneously detecting the detection window signal by a false pattern in the data present nearby a normal SYNC signal. As a result, the accuracy for SYNC detection is further improved than ever and it is possible to improve an error rate at the time of reproducing.

(Third Embodiment)

Figure 15:
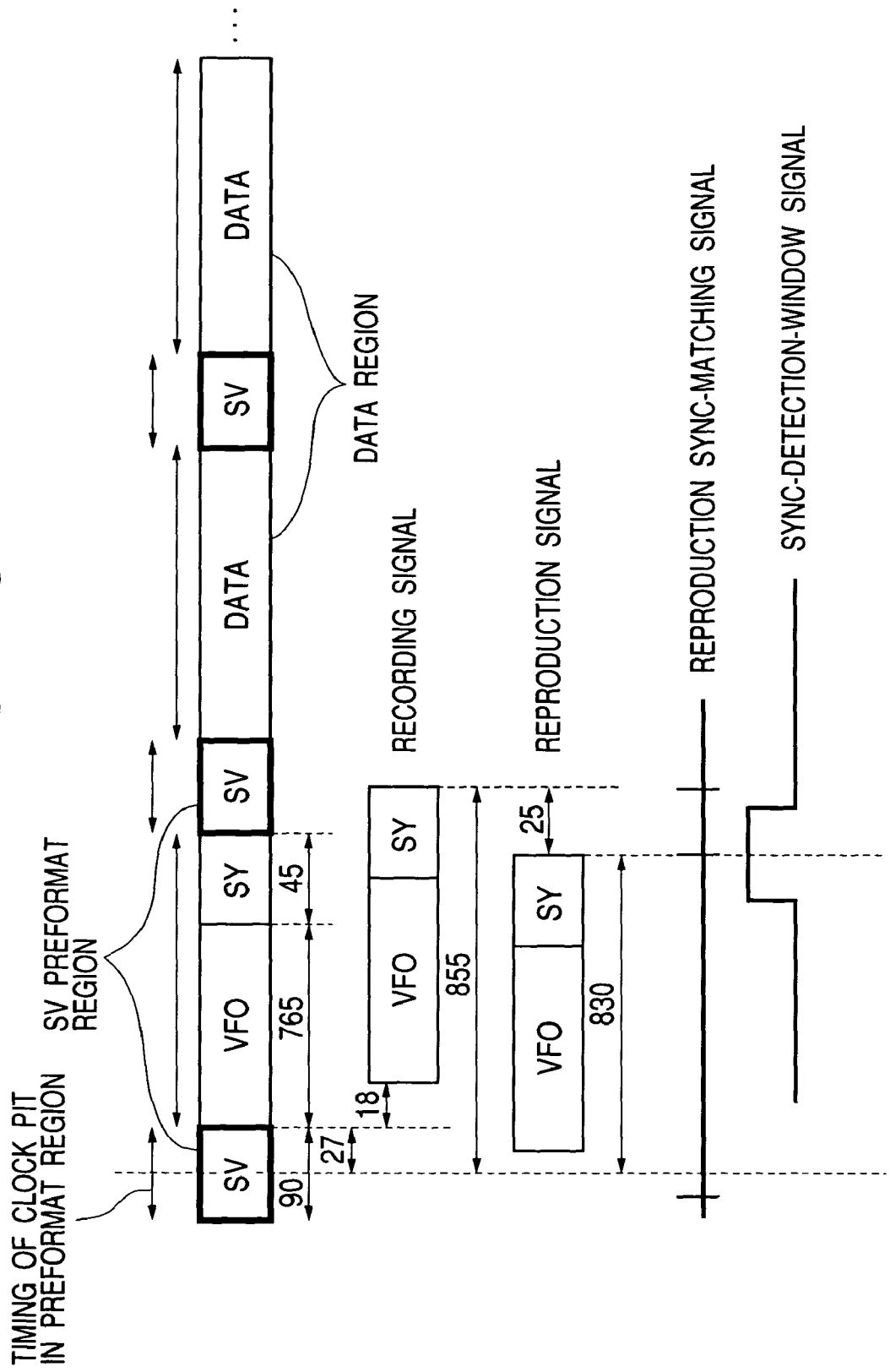
FIG. 15 is a view illustrating a signal format and a timing chart in the third embodiment.

FIG. 15 shows a format of this embodiment. A recording track is constituted by continuously arranging a plurality of segments each constituted by a preformat region and a data region. In the case of this embodiment, a data region is formed in a groove portion and a preformat region is formed at a flat portion formed in the extending direction of the groove portion at the same height as a land part. In each preformat region are formed two wobble pits which are offset with respect to each other by a half track to detect a tracking error and a clock pit for clock reproduction.

In this embodiment, 500 to 1,000 segments are handled as one data management unit depending on the radial position of a disk. In this case, only a clocking pattern (VFO) and a sync signal (SYNC) are recorded in the data region of the head segment and UserData (DATA) is recorded in a data region of a subsequent segment. In this case, when assuming a linear velocity as 2 m/s and a channel clock frequency as 45 MHz, the time length of each section and the number of counts in channel clocks are as follows.

| Preformat section: | 2 μsec (90 counts) |
| VFO section: | 17 μsec (765 counts) |
| SYNC section: | 1 μsec (45 counts) |
| Between clock pits: | 20 μsec (900 counts) |

In this embodiment, at the time of recording, a clock for recording data is generated by a PLL circuit on the basis of a clock signal obtained from a clock pit and recording is performed on the basis of the clock for recording data, as is the case with the first embodiment. However, at the time of reproducing, a clock for reproduced data is generated on the basis of a clock signal obtained from the VFO recorded in the data region and reproducing is performed in accordance with the clock for reproduced data. Incidentally, the PLL operates on the basis of a clock signal obtained from a clock pit until VFO arrives, and when the VFO section arrives, the PLL operates so as to coincide in phase with the VFO part. In this process, the output clock of the PLL always maintain almost the same frequency.

In the case of this embodiment, the method for determining the reproducing start timing is the same as that of the second embodiment. That is, when a SYNC pattern recorded in the data region can be detected, a matching signal is outputted at the rear end of the pattern to determine the reproducing start timing of the UserData in the data region synchronously with the output. The detection of a SYNC pattern is performed such that a detection window signal is generated as with the second embodiment and a matching signal within the range of the window signal is regarded as a true SYNC detection signal.

Then, a manner of determining recording and reproducing timings is described below in more detail.

This manner is the same as the first embodiment in that the clock pit of the preformat section is detected, a binarized signal including the phase error information thereof is inputted to a PLL and a clock for recording data is generated by the PLL. In this case, when assuming that the recording start position on a medium from the clock pit in the preformat region as 1.2 μm, because the linear velocity is 2 m/s, the time from the clock pit to the head of VFO becomes 0.6 μsec (27 counts).

Also in this case, because an offset (or shift) of the time T (Dw)=400 nsec (18 counts) that corresponds to Dw is present as with the first embodiment, the actual counted value of the recording start position of a recording signal becomes 45 counts obtained by adding 18 counts to 27 counts. Then, the value of 45 is set to the recording-start-position register to measure the recording-start timing as with the first embodiment.

Incidentally, the recording timing of SYNC dead end from the clock pit is 855 as a value obtained by addition of counted lengths of VFO and SYNC to each other.

At the time of reproducing, there is a corresponding shift between Dw and Dr as described in the foregoing embodiments. In the case of this embodiment, however, because the linear velocity is 2.0 m/s, the times corresponding to Dr and Dw and the number of counts of clocks are obtained as T(Dr)=155 nsec (7 counts), T(Dw)=400 nsec (18 counts) and about 555 nsec (25 counts) which is the sum thereof becomes the difference between the recording and the reproducing timings.

The last end timing of a SYNC signal at the time of reproducing becomes 830 obtained by subtracting 25, which is the timing difference, from 855 of the timing at the time of recording. By opening a detection window with this timing being the center, it is possible to accurately detect a SYNC matching signal.

In this case, when performing calculation on the assumption that the maximum rotational fluctuation as 1%, the offset of the generation timing of the SYNC matching signal derived from rotational fluctuation becomes about 9 counts. Therefore, it is allowed to keep the width of a detection window signal at ±9 counts. Therefore, it is allowed to set the timing of rise of the detection window signal to 821 counts obtained by subtracting 9 from 830 that is the central timing.

When performing recording in accordance with the above format, it is possible to use a circuit block similar to that described in the first embodiment with the exception that the set value of the recording start timing is set to the above value 855.

Figure 14:
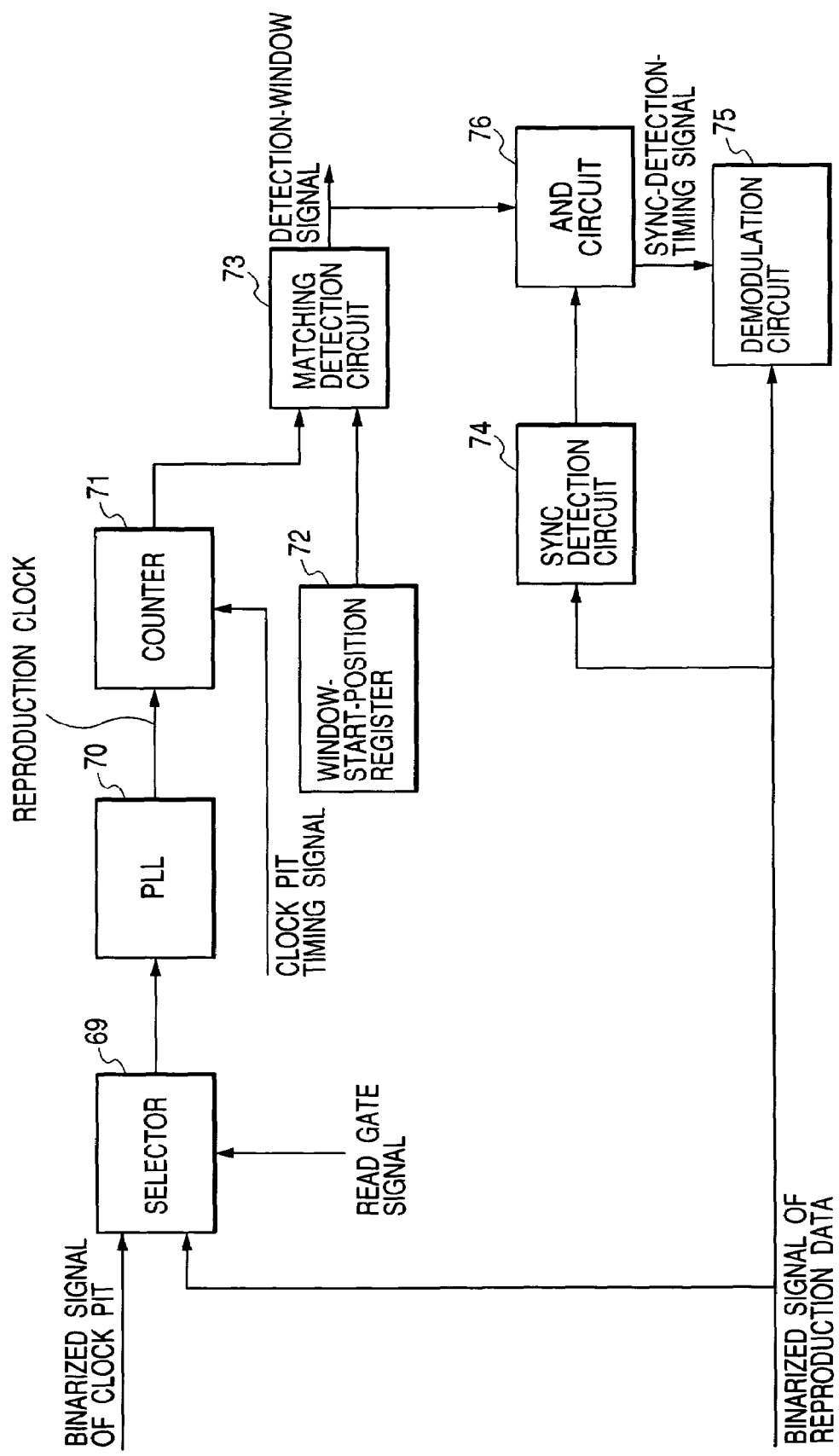
FIG. 14 is a block diagram in a third embodiment.

Then, a specific circuit for performing reproducing in accordance with the above format is described below by referring to FIG. 14. In FIG. 14, a selector 69 is a selector to which a binary signal of a clock pit and a binary signal of a reproduction data signal are inputted to select any output in accordance with a read gate signal separately inputted. At the time of recording, a read gate signal is kept in LOW state and the selector outputs a binary signal (sum signal) of a clock pit. Moreover, a PLL circuit 70 generates a clock synchronizing with the clock pit, as is the case with the first embodiment. A not-illustrated circuit performs recording in accordance with this clock.

At the time of reproducing, the read gate signal becomes HIGH and the selector 69 selects a binary signal (MO signal) of the reproduction data supplied from a not-illustrated reproduction-data processing circuit and outputs it to a PLL circuit 70. The PLL circuit 70 detects the phase difference between the edge timing and the output clock, controls an internal voltage control oscillator so that the phase difference becomes zero and outputs a clock synchronizing with the binary signal of the reproduction data. A reproducing-system circuit such as a demodulation circuit 75 described later operates on the basis of this clock. A counter 71 is cleared at a timing signal for a clock pit detected by a not-illustrated pit-signal processing circuit and counts clocks as the output of the above PLL circuit. A not-illustrated controller sets 821, which is the number of clocks corresponding to a window start position, to the window-start-position register 72. A matching detection circuit 73 compares a counted output value of the counter with a value set to the register, and when the former value matches with the latter value, the circuit 73 outputs a detection window signal which becomes HIGH only for a period equivalent to a predetermined number of clocks (18 in the case of this embodiment). The register 72 and matching detection circuit 73 are both operated in accordance with the above reference clocks. In this case, the number of clocks may slightly change when phase-locking with the binary signal of reproduction data in operation of the PLL circuit. However, because the frequency of clock is controlled so as to be almost constant, the influence of a time shift of a SYNC detection window due to a shift of a counted value is small.

A SYNC detection circuit 74 outputs a SYNC matching signal which becomes HIGH for only one clock when matching with a SYNC pattern or at the timing which matches with a predetermined number of errors or less from a binary pattern of a reproduction signal. Moreover, an AND circuit 76 computes the logical product between a SYNC matching signal and a detection window signal and outputs the result thereof as a SYNC detection signal.

When this SYNC detection timing signal is inputted to the demodulation circuit 75, the demodulation circuit confirms the SYNC position and demodulates the data modulated in accordance with an RLL (1,7) code. Because the RLL (1,7) code converts two bits into three bits at the time of modulation, it converts three bits collectively into two bits at the time of demodulation. Thus, demodulation is started while dividing data into every three bits from the bits of the reproduction data signal immediately subsequent to SYNC. In this case, a reproduction clock is used as operation clocks of the detection circuit and demodulation circuit.

As described above, in this embodiment, a predetermined prepit in a preformat region is defined as a reference, a clock synchronizing with the predetermined prepit is generated, and the recording timing is determined by using the clock. Further, at the time of reproducing, a VFO pattern recorded in a data region is defined as a reference to generate a clock synchronizing with a reproduction data and generate a detection window signal using the clock. Moreover, because the detection-window-signal generation timing is set to a timing that is earlier than the recording timing, it is possible to properly detect a SYNC signal, so that the accuracy of reproduction data detection is improved and the error rate can be reduced.

In the case of the above embodiments, clock counting is started in accordance with the timing signal of a clock pit.

However, it is also possible to start clock counting on the basis of a signal obtained from another pit provided in a preformat section or a groove-end signal obtained at a boundary between a flat portion on which a preformat section is provided and a groove portion on which a data region is provided.

As described above, according to the present invention, by setting the reproducing timing to be earlier than the recording timing, it is possible to provide a recording/reproducing apparatus for a domain-wall-replacement magneto-optical recording medium with good format efficiency that secure a maximum recording region for a user while maintaining the quality of a reproduction.

What is claimed is:

1. A recording/reproducing apparatus for a domain-wall-displacement magneto-optical recording medium for recording or reproducing an information by irradiating a light beam to a data region subsequent to a preformat region, comprising:
    a recording circuit that starts recording of an information in the data region at a predetermined timing with a detection signal obtained in the preformat region being used as a reference; and
    a reproducing circuit that starts reproducing of the information recorded in the data region at a timing earlier than the predetermined timing with the detection signal being used as a reference,
    wherein a sector mark (SM), a fixed pattern (VFO section) for extracting a clock when detecting an address, an address mark (AM), and an address pit are formed in the preformat region; a fixed pattern (VFO section) for extracting a clock when reproducing the information and a SYNC mark for attaining byte synchronization are formed in the data region; and the timing is measured by a clock with a fixed frequency or a clock generated on the basis of a VFO pattern of the data region with a detection signal obtained in the preformat region being used as a reference.

2. The recording/reproducing apparatus according to claim 1, wherein the detection signal is a detection signal of an address mark.

3. The recording/reproducing apparatus according to claim 1, wherein a pair of wobble pits for tracking, and a clock pit are formed in the preformat region and wherein the recording timing is measured by a clock generated by the clock pit.

4. The recording/reproducing apparatus according to claim 3, wherein the detection signal is a detection signal of the clock pit.

5. The recording/reproducing apparatus according to claim 3, wherein the medium has a substrate, the data region is provided on a groove portion formed on the substrate, the preformat section is provided on a flat portion of the substrate, and the detection signal is a signal obtained at a boundary portion between the groove portion and the flat portion.

6. The recording/reproducing apparatus according to claim 1, wherein the difference between the recording and the reproducing timings corresponds to a time obtained by dividing a sum of a distance between a position at which a domain wall of a recording mark is formed at the time of recording and a center of a light beam and a distance between a position at which displacement of the domain wall starts at the time of reproducing and the center of the light beam, by a linear velocity of the medium.

7. The recording/reproducing apparatus according to claim 1, wherein the reproducing circuit includes a SYNC-mark detection circuit for detecting the SYNC mark and outputting a SYNC matching signal and a detection-window-signal generation circuit for extracting the SYNC matching signal, and the reproducing circuit, when detecting the SYNC matching signal in the detection window signal, starts demodulation of a subsequent information synchronously with the detection timing.

8. The recording/reproducing apparatus according to claim 3, wherein the reproducing circuit includes a SYNC-mark detection circuit for detecting the SYNC mark and outputting a SYNC matching signal and a detection-window-signal generation circuit for extracting the SYNC matching signal, and the reproducing circuit, when detecting the SYNC matching signal in the detection-window-signal, starts demodulation of a subsequent information synchronously with the detection timing.

9. The recording/reproducing apparatus according to claim 7, wherein the detection-window generation circuit generates the detection window signal using as a center a timing earlier than a recording timing at a rearmost end of the SYNC mark.

10. The recording/reproducing apparatus according to claim 8, wherein the detection-window generation circuit generates the detection window signal using as a center a timing earlier than a recording timing at a rearmost end of the SYNC mark.

* * * * *

UNITED STATES PATENT AND TRADEMARK OFFICE
CERTIFICATE OF CORRECTION

PATENT NO. : 7,200,072 B2  Page 1 of 1
APPLICATION NO. : 10/615174
DATED : April 3, 2007
INVENTOR(S) : Katsumi Arisaka It is certified that error appears in the above-identified patent and that said Letters Patent is hereby corrected as shown below:

TITLE PAGE [57] ABSTRACT:

Line 6, "an" should be deleted; and "used-as" should read --used as--.

IN THE DRAWINGS SHEET 1:

Figure 1, "GENRATION" should read --GENERATION--.

COLUMN 1:

Line 9, "a" should be deleted; and
Line 21, "an" should be deleted.

COLUMN 2:

Line 5, "forth" should read --force--; and
Line 12, "$F_1 = \partial \sigma_1 \partial x$" should read --$F_1 = \partial \sigma_1 / \partial X$--.

COLUMN 10:

Line 58, "400usec," should read --400n sec,--.

COLUMN 15:

Line 17, "an" should be deleted; and
Line 20, "an" should be deleted.

Signed and Sealed this

Sixteenth Day of September, 2008

JON W. DUDAS
*Director of the United States Patent and Trademark Office*